(12) United States Patent
Kim et al.

(10) Patent No.: US 9,123,952 B2
(45) Date of Patent: Sep. 1, 2015

(54) NEGATIVE ELECTRODE ACTIVE MATERIAL, METHOD OF PREPARING THE SAME, NEGATIVE ELECTRODE AND LITHIUM SECONDARY BATTERY EMPLOYING THE ELECTRODE INCLUDING THE NEGATIVE ELECTRODE ACTIVE MATERIAL

(71) Applicant: Samsung SDI Co., Ltd., Yongin-si, Gyeonggi-Do (KR)

(72) Inventors: Deok-Hyun Kim, Yongin (KR); Jae-Myung Kim, Yongin (KR); Kyu-Nam Joo, Yongin (KR); Soon-Sung Suh, Yongin (KR); Yeon-Gap Kim, Yongin (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 218 days.

(21) Appl. No.: 13/831,443

(22) Filed: Mar. 14, 2013

(65) Prior Publication Data
US 2014/0162129 A1    Jun. 12, 2014

(30) Foreign Application Priority Data

Dec. 10, 2012  (KR) .......................... 10-2012-0143028

(51) Int. Cl.
| | |
|---|---|
| *H01M 4/13* | (2010.01) |
| *H01M 4/36* | (2006.01) |
| *H01M 4/04* | (2006.01) |
| *H01M 4/139* | (2010.01) |
| *H01M 4/38* | (2006.01) |
| *H01M 4/48* | (2010.01) |
| *H01M 4/62* | (2006.01) |

(Continued)

(52) U.S. Cl.
CPC ............... *H01M 4/364* (2013.01); *C01B 33/18* (2013.01); *H01M 4/0419* (2013.01); *H01M 4/13* (2013.01); *H01M 4/139* (2013.01); *H01M 4/386* (2013.01); *H01M 4/483* (2013.01); *H01M 4/62* (2013.01); *H01M 4/625* (2013.01);

(Continued)

(58) Field of Classification Search
CPC ........................ H01M 4/386; H01M 2004/027
USPC ...................................................... 429/231.8
See application file for complete search history.

(56) References Cited

U.S. PATENT DOCUMENTS

| | | | |
|---|---|---|---|
| 5,474,861 | A | 12/1995 | Bito et al. |
| 2003/0215711 | A1 | 11/2003 | Aramata et al. |

(Continued)

FOREIGN PATENT DOCUMENTS

| | | |
|---|---|---|
| JP | 6-302315 A | 10/1994 |
| JP | 2003-308837 A | 10/2003 |

(Continued)

OTHER PUBLICATIONS

Morita, Tomokazu, et al., "Nano Si Cluster-SiO$_x$—C Composite Material as High-Capacity Anode Material for Rechargeable Lithium Batteries," *Journal of The Electrochemical Society*, 153 (2) A425-A430 (2006).

(Continued)

*Primary Examiner* — Jane Rhee
(74) *Attorney, Agent, or Firm* — Knobbe Martens Olson & Bear LLP

(57) ABSTRACT

In an aspect, a negative electrode active material, a method of preparing the same, and a lithium secondary battery having the negative electrode including the negative electrode active material is provided. The negative electrode active material may include amorphous silicon oxide, crystalline silicon, carbon, metal silicide, spherical particles and whiskers.

18 Claims, 11 Drawing Sheets

(51) Int. Cl.
    *C01B 33/18*    (2006.01)
    *H01M 4/02*    (2006.01)

(52) U.S. Cl.
    CPC .. *H01M 2004/021* (2013.01); *H01M 2004/027* (2013.01); *Y02E 60/122* (2013.01)

(56) References Cited

U.S. PATENT DOCUMENTS

| | | |
|---|---|---|
| 2005/0233213 A1 | 10/2005 | Lee et al. |
| 2006/0166098 A1 | 7/2006 | Tabuchi et al. |
| 2011/0159365 A1* | 6/2011 | Loveness et al. ......... 429/218.1 |
| 2011/0215280 A1 | 9/2011 | Obrovac et al. |

FOREIGN PATENT DOCUMENTS

| | | |
|---|---|---|
| JP | 2007-042393 A | 2/2007 |
| JP | 3952180 B2 | 5/2007 |
| JP | 2007-329001 A | 12/2007 |
| JP | 2009-301937 A | 12/2009 |
| KR | 10-2002-0008702 A | 1/2002 |
| KR | 10-2005-0007311 A | 1/2005 |

OTHER PUBLICATIONS

Extended European Search Report dated Mar. 25, 2014 for European Patent Application No. EP 13 185 707.0 which shares priority of Korean Patent Application No. KR 10-2012-0143028.

* cited by examiner

NEGATIVE ELECTRODE ACTIVE MATERIAL, METHOD OF PREPARING THE SAME, NEGATIVE ELECTRODE AND LITHIUM SECONDARY BATTERY EMPLOYING THE ELECTRODE INCLUDING THE NEGATIVE ELECTRODE ACTIVE MATERIAL

INCORPORATION BY REFERENCE TO ANY PRIORITY APPLICATIONS

Any and all applications for which a foreign or domestic priority claim is identified in the Application Data Sheet as filed with the present application, are hereby incorporated by reference under 37 CFR 1.57. For example, this application claims priority to and the benefit of Korean Patent Application No. 10-2012-0143028 filed on Dec. 10, 2012, in the Korean Intellectual Property Office, the disclosure of which is incorporated herein in its entirety by reference.

BACKGROUND

1. Field

This disclosure relates to a negative electrode active material, a method of preparing the same, a negative electrode including the negative electrode active material, and a lithium secondary battery including the electrode.

2. Description of the Related Technology

With technological advances in portable electronic devices and communication devices, there has been an increasing demand for the development of lithium secondary batteries with high-energy density.

An oxide of a metal such as vanadium, silicon, bismuth, or zirconium may be used as a negative electrode active material for a lithium secondary battery. When silicon oxide is used as the negative electrode active material, a negative electrode having high capacity may be manufactured. However, an electrode including silicon oxide is typically not satisfactory in lifetime characteristics and conductivity characteristics, and thus, there is still need for improvement.

SUMMARY

One or more embodiments include a negative electrode active material with improved conductivity, capacity and lifetime characteristics.

One or more embodiments include a method of preparing the negative electrode active material.

One or more embodiments include a lithium secondary battery employing the negative electrode including the negative electrode active material.

Additional aspects will be set forth in part in the description which follows and, in part, will be apparent from the description, or may be learned by practice of the presented embodiments.

Some embodiments provide a negative electrode active material includes amorphous silicon oxide, crystalline silicon, carbon, metal silicide, spherical particles and whiskers.

Some embodiments provide a method of preparing the above-described negative electrode active material includes: mixing amorphous silicon oxide, carbon precursor, silicon, metal silicide, and a first solvent together to obtain a negative electrode active material composition; and spray-drying the negative electrode active material composition.

Some embodiments provide a lithium secondary battery includes a negative electrode containing the above-described negative electrode active material.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
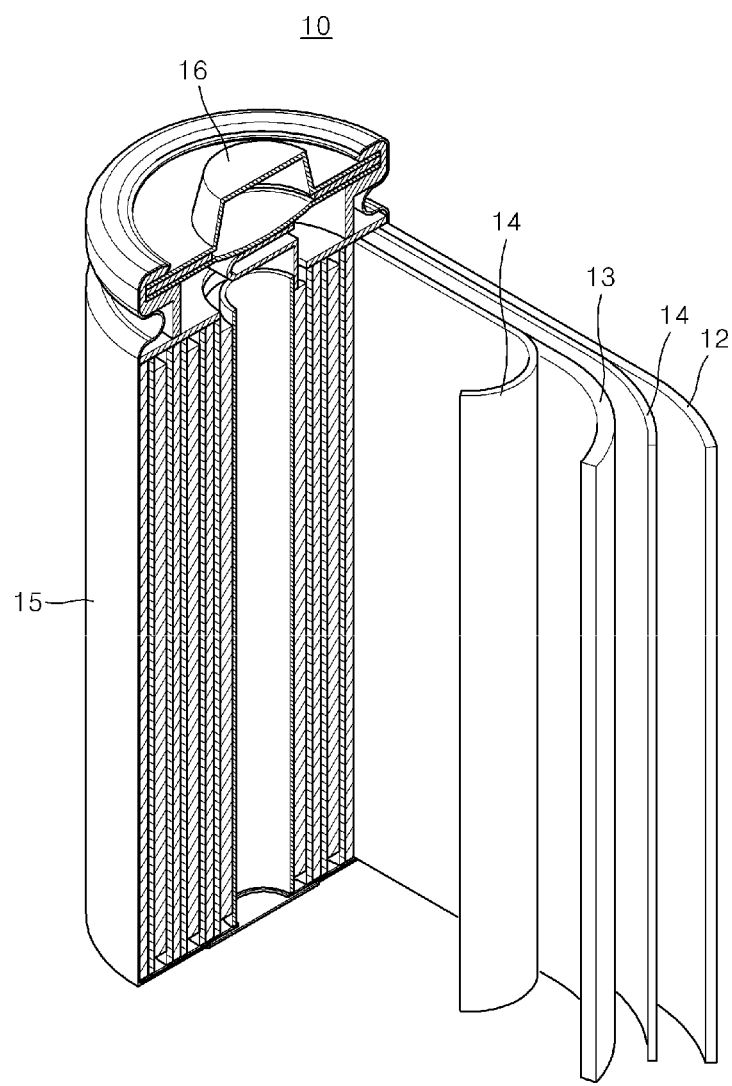
FIG. 1 is a schematic view of a lithium secondary battery according to an embodiment.
Figure 2:
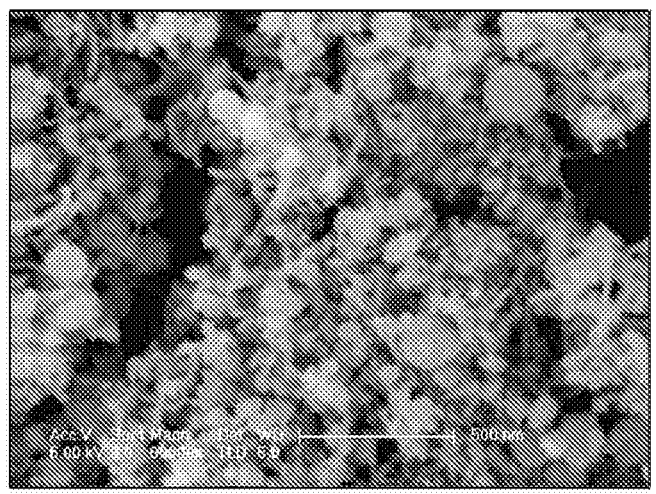
FIGS. 2 to 6 are scanning electron microscopic (SEM) images of negative electrode active materials prepared in Examples 1 to 5, respectively.
Figure 3:
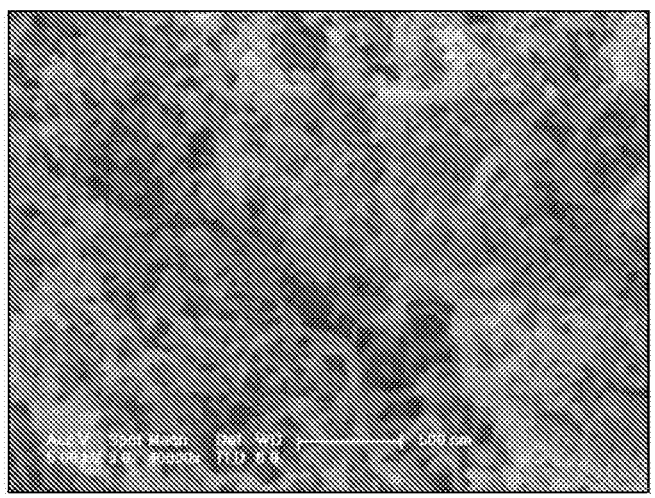
Figure 4:
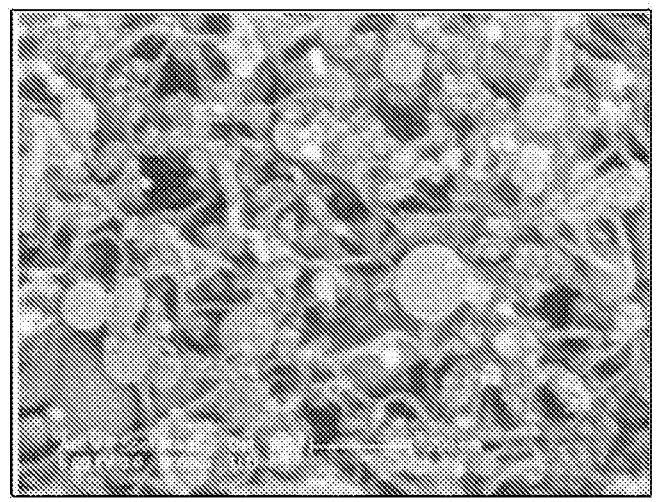
Figure 5:
Figure 6:
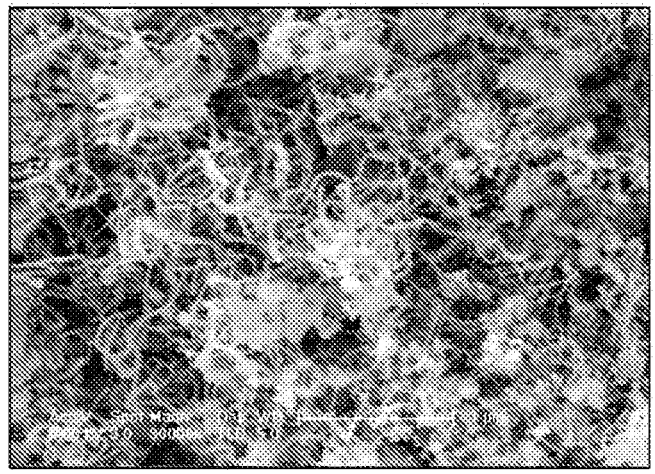
Figure 7A:
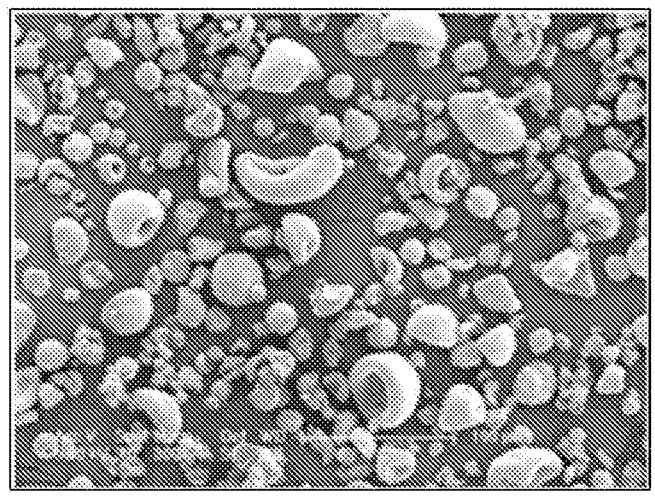
FIGS. 7A to 7D are SEM images of a negative electrode active material of Example 6.
Figure 7B:
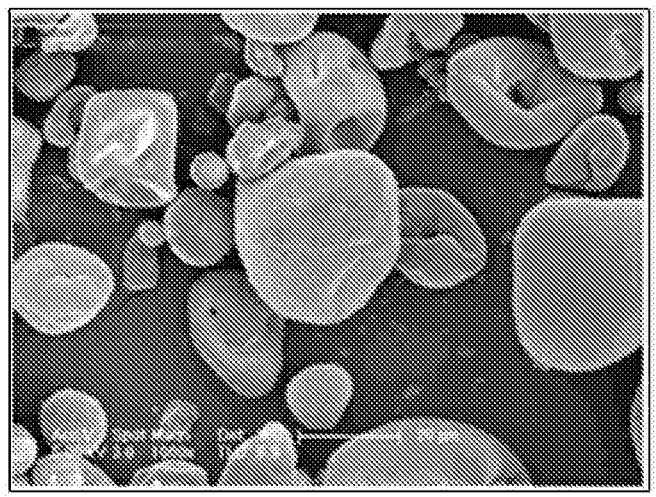
Figure 7C:
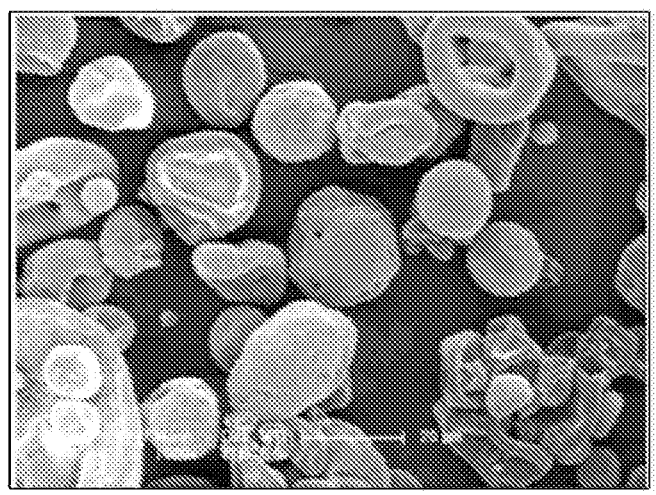
Figure 7D:
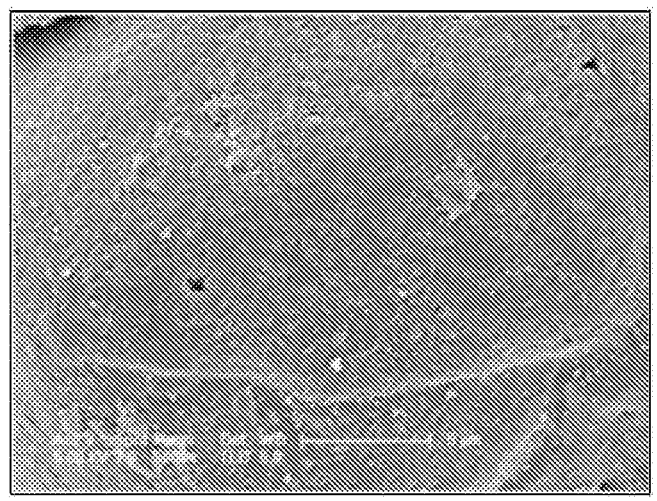

Reference will now be made in detail to embodiments of a negative electrode active material, a method of preparing the same, and a lithium secondary battery employing a negative electrode including the negative electrode active material, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Some embodiments provide a negative electrode active material may include amorphous silicon oxide, crystalline silicon, carbon, and metal silicide components, wherein one or more of the components is included in spherical particles and whiskers.

In some embodiments, the spherical particles of the negative electrode active material contain crystalline silicon, amorphous silicon oxide, metal silicide, and carbon, and the whiskers of the negative electrode active material contain crystalline silicon and amorphous silicon oxide.

The term "whiskers" refer to a structure in needle shape, rod shape and/or fiber shape having a predetermined length and thickness.

In some embodiments, the whiskers may have a length of from about 1 μm to about 5 μm, and a thickness of from about 10 nm to about 20 nm. When the length and thickness of the whiskers are within these ranges, the negative electrode active material may have improved capacity characteristics, without a reduction in density.

In some embodiments, the whiskers of the negative electrode active material may be within the spherical particles, forming pores in the negative electrode active material, which may improve electrolyte retaining characteristics. In some embodiments, the spherical particles may facilitate intercalation of lithium ions, and thus improve input/output characteristics. In some embodiments, the whiskers may undergo volumetric expansion only in up and down directions, which may prevent lifetime reduction caused by expansion. In some embodiments, the metal silicide such as nickel silicide may improve conductivity of the negative electrode active material.

In some embodiments, the spherical particles may have an average particle diameter of from about 5 μm to about 15 μm, and in some embodiments, from about 5 μm to about 7 μm. When the average particle diameter of the spherical particles is within these ranges, a lithium secondary battery using the negative electrode active material may have improved charge/discharge characteristics.

For example, the amorphous silicon oxide may be represented by Formula 1 below.

$$SiO_x \qquad \text{Formula 1}$$

In Formula 1, x may be in the range of $0<X\leq 2$. In some embodiments, x may be in the range of from 0.5 to 1.2.

In some embodiments, the metal silicide may serve as a seed for growing the whiskers. In some embodiments, the metal silicide may be at least one selected from the group consisting of nickel silicide, titanium silicide, copper silicide, and iron silicide.

An amount of the metal silicide may be from about 0.5 parts to about 10 parts by weight, and in some embodiments, from about 0.5 parts to about 5.0 parts by weight, based on 100 parts by weight of a total weight of the negative electrode active material. When the amount of the metal silicide is within these ranges, a mixed ratio of the spherical particles to the whiskers may be appropriately controlled for improved capacity and lifetime characteristics In some embodiments, the mixed ratio of the spherical particles to the whiskers may be from about 70:30 to about 99:1 by weight.

In some embodiments, an amount of the silicon oxide in the negative electrode active material may be from about 70 parts to 90 parts by weight based on 100 parts by weight of the total weight of the negative electrode active material. When the amount of the silicon oxide is within this range, the negative electrode active material may have improved charge/discharge capacity and cycle characteristics.

In some embodiments, an amount of the silicon may be from about 10 parts to about 50 parts by weight based on 100 parts by weight of a total weight of the negative electrode active material. When the amount of the silicon is within this range, the negative electrode active material may have improved charge/discharge capacity and cycle characteristics.

In some embodiments, an amount of the carbon may be from about 1 part to about 10 parts by weight based on 100 parts by weight of the total weight of the negative electrode active material. When the amount of the carbon is within this range, the negative electrode active material may have improved conductivity without deterioration in cycle characteristics and charge/discharge capacity.

In some embodiments, the negative electrode active material may have an average particle diameter of from about 1 nm to about 300 nm, and in some embodiments, from about 2 nm to about 50 nm.

When the average particle diameter of the negative electrode active material is within these ranges, a battery with improved cycle characteristics may be manufactured without deterioration in charge/discharge capacity of the negative electrode active material.

In some embodiments, the average particle diameters of the negative electrode active material and the spherical particles may be measured using electron scanning microscopy (SEM) or X-ray diffraction (XRD) analysis.

In some embodiments, a structure of the negative electrode active material may be identified based on peaks in an X-ray diffraction spectrum thereof.

For example, a peak of the nickel silicide may appear at a Bragg angle 2θ of from 27° to about 29°, and in some embodiments, from about 27.5° to about 28.5°, in the X-ray diffraction spectrum of the negative electrode active material.

In some embodiments, a peak from the Si(111) plane of the negative electrode active material may be at a Bragg angle 2θ of from about 27° to about 29°, and in some embodiments, from about 27.5° to about 28.5°.

In some embodiments, the negative electrode active material may provide a discharge capacity per unit weight of about 2270 mAh/g or greater, and a discharge capacity per unit volume of about 1130 mAh/cc or greater. In some embodiments, the negative electrode active material may have an electric conductivity of about 20 S/m to about 40 S/m.

In some embodiments, the electric conductivity may be measured by measuring resistance of the negative electrode active material filled in a cylindrical holder having a diameter of 2 cm using a 4-probe method while a pressure of 4 kN~20 kN is applied.

In some embodiments, the content of each component in the negative electrode active material, such as silicon, oxygen, carbon, and a metal such as nickel, may be calculated from a peak intensity of each component obtained by X-ray fluorescence (XRF) analysis.

In some embodiments, a negative electrode and a lithium secondary battery that have improved capacity, lifetime characteristics and initial efficiency may be manufactured using the negative electrode active material.

Hereinafter, a method of preparing the negative electrode active material, according to an embodiment of the present invention will be described.

First, amorphous silicon oxide, silicon, a carbon precursor, metal silicide, and a first solvent are mixed together to prepare a negative electrode active material composition.

In preparing the negative electrode active material composition, the orders of adding and mixing the amorphous silicon oxide, silicon, carbon precursor, and metal silicide are not specifically limited. For example, after dissolving the carbon precursor in the second solvent, the resulting solution may be mixed with a composition containing the amorphous silicon oxide, silicon, metal silicide, and the first solvent.

Non-limiting examples of the second solvent are water, ethanol, isopropylalcohol, and tetrahydrofuran. In some embodiments, an amount of the second solvent may be from about 100 parts to about 2000 parts by weight based on 100 parts by weight of the carbon precursor.

In some embodiments, an amount of the silicon may be from about 10 parts to about 200 parts by weight based on 100 parts by weight of the amorphous silicon oxide.

In some embodiments, an amount of the metal silicide may be from about 1 part to about 10 parts by weight based on 100 parts by weight of the amorphous silicon oxide.

When the amounts of the silicon and metal silicide are within these ranges, the negative electrode active material may have improved capacity and conductivity.

In some embodiments, the negative electrode active material composition may be subjected to spray-drying to obtain a target negative electrode active material.

In some embodiments, the sprayed negative electrode active material composition has spherical shape due to surface tension of the negative electrode active material composition according to the parameters of the spray-drying process. As a result, the negative electrode active material obtained by drying the sprayed negative electrode active material composition may include spherical particles having a larger diameter as compared with the prior art, and whiskers. In some embodiments, the negative electrode active material including spherical particles and whiskers may be easily prepared through the spray-drying process. In some embodiments, the negative electrode active material prepared through the spray-drying may have pores, and thus may prevent volumetric expansion of silicon during charging/discharging. In some embodiments, a coating film formed carbonaceous material may be achieved at the same time by the spray-drying process.

In some embodiments, a solid content of the negative electrode active material composition may be from about 5 parts to about 20 parts by weight based on 100 parts by weight of the negative electrode active material composition.

In some embodiments of the spray-drying process, a spray pressure on the negative electrode active material composition may be from about 300 Pa to about 500 Pa. When the spray pressure is within this range, the negative electrode active material may have improved capacity and conductivity characteristics.

In some embodiments of the spray-drying process, a thermal treatment temperature may be from about 700° C. to about 1000° C. When the thermal treatment temperature is within this range, the negative electrode active material may include whiskers. In some embodiments, a thermal treatment time, which is dependent upon the thermal treatment temperature, may be from 2 hours to 6 hours.

In some embodiments, the spray-drying may be performed in an inert gas condition. In some embodiments, the spray-drying may be performed in a nitrogen gas atmosphere.

In some embodiments of the spray-drying, the negative electrode active material composition may be injected at a rate of from about 30 ml/min to about 50 ml/min. When the injection rate of the negative electrode active material composition is within this range, the negative electrode active material may have improved capacity and conductivity characteristics.

Non-limiting examples of the first solvent are water, methanol, ethanol, N-methylpyrrolidone. In some embodiments, an amount of the first solvent may be adjusted so that a total solid content of the negative electrode active material composition, including the amorphous silicon oxide, silicon, carbon, and metal silicide, is from about 50 wt % to about 60 wt %.

Non-limiting examples of the carbon precursor are carbon black, pitch, sucrose, carbon nanotube (CNT), and phenol resin. For example, the carbonaceous material may be pitch or sucrose.

In some embodiments, an amount of the carbon precursor may be from about 5 parts to about 30 parts by weight based on 100 parts by weight of the silicon oxide.

When sucrose is used as the carbon precursor, the negative electrode active material as a final product may further include non-spherical particles, in addition to the spherical particles and whiskers.

In some embodiments, the negative electrode active material composition prepared as described above may have a viscosity of from about 50 cP to about 150 cP. When the viscosity of the negative electrode active material composition is within this range, processability may be improved, and the resulting negative electrode active material may be porous.

In some embodiments, the negative electrode active material obtained through the spray-drying as describe above may have a particle diameter of from about 5 μm to about 15 μm.

In some embodiments, a coating film formed of carbonaceous material may be further formed to control a specific surface area of the negative electrode active material. This may further improve the conductivity of the negative electrode active material.

In some embodiments, the negative electrode active material may have a specific surface area of from about 50 $m^2$/g to about 100 $m^2$/g.

Through the above-described spray-drying process, the negative electrode active material including a coating film formed of carbonaceous material may be prepared at the same time. The overall preparation of the negative electrode active material is simple and easy, and the preparation cost of the negative electrode active material is reduced.

In some embodiments, the amorphous silicon oxide may be prepared using a plasma synthesis method or a thermal evaporation method.

For example, a plasma synthesis method of forming the amorphous silicon oxide may be as follows.

In some embodiments, SiOx (0<X≤2) may be synthesized using a DC plasma method. This plasma method may involve heating silicon using plasma heat for reaction with an amount of oxygen to synthesize SiOx (0<X≤2). This method is suitable for the synthesis of nano SiOx (0<X≤2). In some embodiments, the plasma power may be from about 50~80 KW, and a plasma gas may be Ar, $N_2$, or He. According to the parameters of the synthesis method, plasma discharging may be induced in a plasma torch so that a plasma beam in the negative electrode-positive electrode field is accelerated to melt and evaporate Si lump in the furnace hearth. In some embodiments, the resulting product may be passed through a cooling column, and then crude larger particles from the resulting product are removed in a cyclone. In some embodiments, the collected nanosized particles may be then passed through primary and secondary traps to obtain final nano-SiOx (0<X≤2) powder The above-described plasma synthesis method is suitable for synthesis of SiOx (0<X≤2) with high silicon content and in nano-sized powder. Since Si and $SiO_2$ are mixed together, $SiO_2$ may serve as a buffer for preventing volumetric expansion of silicon.

For example, the thermal evaporation method of preparing silicon oxide may be as follows.

In some embodiments, a $SiO_2$/Si mixed pellet or powder may be evaporated through solid state reaction by adiabatic condensation to be deposited thick on a substrate, and then scrapped. In some embodiments, the scrapped product is grinded and sorted, thereby preparing silicon oxide.

In some embodiments, the negative electrode active material may further include another common negative electrode active material, in addition to the above-described negative electrode materials. The common negative electrode active material may be any negative electrode active material for lithium batteries available in the art. In some embodiments, the common negative electrode active material may include at least one selected from the group consisting of lithium metal, a metal that is alloyable with lithium, a transition metal oxide, a non-transition metal oxide, and a carbonaceous material.

Examples of the metal alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). In some embodiments, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or polonium (Po), or combinations thereof.

Non-limiting examples of the transition metal oxide are a lithium titanium oxide, a vanadium oxide, and a lithium vanadium oxide.

Non-limiting examples of the non-transition metal oxide are $SnO_2$ and $SiO_x$ (0<x<2).

Examples of the carbonaceous material are crystalline carbon, amorphous carbon, and mixtures thereof. Examples of the crystalline carbon are graphite, such as natural graphite or artificial graphite that are in amorphous, plate, flake, spherical or fibrous form. Examples of the amorphous carbon are soft carbon (carbon sintered at low temperatures), hard carbon, meso-phase pitch carbides, sintered corks, and the like.

The negative electrode may be manufactured as follows.

In some embodiments, the negative electrode active material, a conducting agent, a binder, and a solvent are mixed to prepare an negative electrode active material composition, which is then directly coated on a copper current collector, thereby manufacturing an negative electrode plate. In some embodiments, the negative electrode active material composition may be cast on a separate support, and then an negative electrode active material film separated from the support may be laminated on a copper current collector to prepare an negative electrode plate.

In some embodiments, the conducting agent, the binder, and the solvent in the negative electrode active material composition may be the same as those used in the positive electrode active material composition. In some embodiments, a plasticizer may be further added into the negative electrode active material composition to form a negative electrode plate including pores.

The amounts of the negative electrode active material, the conducting agent, the binder, and the solvent are those levels that are generally used in the manufacture of a lithium battery. At least one of the conducting agent, the binder and the solvent may not be used according to the use and the structure of the lithium battery.

The negative electrode manufacturing method and the composition and structure of the negative electrode may be appropriated varied for applications in other electrochemical cells, such as supercapacitors, in addition to lithium secondary batteries.

In some embodiments, an negative electrode for a capacitor may be manufactured by disposing a metal structure on a conductive substrate and coating the above-described negative electrode active material composition on the metal structure. In some other embodiments, the above-described negative electrode active material composition may be directly coated on the conductive substrate.

A positive electrode including a positive electrode active material may be manufactured as follows:

First, a positive electrode active material, a conducting agent, a binder, and a solvent are mixed to prepare a positive electrode active material composition. In some embodiments, the positive electrode active material composition may be directly coated on an aluminum current collector and dried to form a positive electrode with a positive electrode active film thereon. In some embodiments, the positive electrode active material composition may be cast on a separate support to form a positive electrode active material film, which is then separated from the support and laminated on an aluminum current collector to prepare a positive electrode plate with the positive electrode active material film.

In some embodiments, the positive electrode active material may further include a common positive electrode active material, in addition to the above-described positive electrode active material. The common positive electrode active material may be any one available in the art, for example, may be a lithium-containing metal oxide. For example, the common positive electrode active material may be at least one of a lithium composite oxide with a metal selected from among cobalt, manganese, nickel, and a combination thereof. In some embodiments, the lithium-containing metal oxide may be one of $Li_aA_{1-b}B^1{}_bD^1{}_2$ (where 0.90≤a≤1.8, and 0≤b≤0.5); $Li_aE_{1-b}B^1{}_bO_{2-c}D^1{}_c$ (where 0.90≤a≤1.8, 0≤b≤0.5, and 0≤c≤0.05); $LiE_{2-b}B^1{}_bO_{4-c}D^1{}_c$ (where 0≤b≤0.5, and 0≤c≤0.05); $Li_aNi_{1-b-c}Co_bB^1{}_cD^1{}_\alpha$ (where 0.90≤a≤1.8, 0≤b≤0.5, 0≤c≤0.05, and 0<α≤2); $Li_aNi_{1-b-c}Co_bB^1{}_cO_{2-\alpha}F^1{}_\alpha$ (where 0.90≤a≤1.8, 0≤b≤0.5, 0≤c≤0.05, and 0<α<2); $Li_aNi_{1-b-c}Co_bB^1{}_cO_{2-\alpha}F^1{}_2$ (where 0.90≤a≤1.8, 0≤b≤0.5, 0≤c≤0.05, and 0<α<2); $Li_aNi_{1-b-c}Mn_bB^1{}_cD^1{}_\alpha$ (where 0.90≤a≤1.8, 0≤b≤0.5, 0≤c≤0.05, and 0<α≤2); $Li_aNi_{1-b-c}Mn_bB^1{}_cO_{2-\alpha}F^1{}_\alpha$ (where 0.90≤a≤1.8, 0≤b≤0.5, 0≤c≤0.05, and 0<α<2); $Li_aNi_{1-b-c}Mn_bB^1{}_cO_{2-\alpha}F^1{}_2$ (where 0.90≤a≤1.8, 0≤b≤0.5, 0≤c≤0.05, and 0<α<2); $Li_aNi_bE_cG_dO_2$ (where 0.90≤a≤1.8, 0≤b≤0.9, 0≤c≤0.5, 0.001≤d≤0.1); $Li_aNi_bCo_cMn_dGeO_2$ (where 0.90≤a≤1.8, 0≤b≤0.9, 0≤c≤0.5, 0≤d≤0.5, and 0.001≤e≤0.1); $Li_aNiG_bO_2$ (where 0.90≤a≤1.8, and 0.001≤b≤0.1); $Li_aCoG_bO_2$ (where 0.90≤a≤1.8, and 0.001≤b≤0.1); $Li_aMnG_bO_2$ (where 0.90≤a≤1.8, and 0.001≤b≤0.1); $Li_aMn_2G_bO_4$ (where 0.90≤a≤1.8, and 0.001≤b≤0.1); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the formulae above, A is selected from the group consisting of nickel (Ni), cobalt (Co), manganese (Mn), and combinations thereof; $B^1$ is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ is selected from the group consisting of oxygen (O), fluorine (F), sulfur (S), phosphorus (P), and combinations thereof; E is selected from the group consisting of cobalt (Co), manganese (Mn), and combinations thereof; $F^1$ is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; $I^1$ is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

In some embodiments, the lithium-containing metal oxide may be $LiCoO_2$, $LiMn_xO_{2x}$ (x=1 or 2), $LiNi_{1-x}Mn_xO_{2x}$ (0<x<1), $Ni_{1-x-y}Co_xMn_yO_2$ (0=x=0.5, 0=y=0.5), or $LiFePO_4$.

In some embodiments, the compounds listed above as positive electrode active materials may have a surface coating layer (hereinafter, "coating layer"). In some embodiments, a mixture of a compound without a coating layer and a compound having a coating layer, the compounds being selected from the compounds listed above, may be used. In some embodiments, the coating layer may include at least one compound of a coating element selected from the group consisting of an oxide, a hydroxide, an oxyhydroxide, an oxycarbonate, and a hydroxycarbonate of the coating element. The compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the positive electrode active material when a compound of the coating element is used. For example, the coating layer may be formed using a spray coating method, a dipping method, or the like. Non-limiting examples of the conducting agent are carbonaceous materials such as carbon black, graphite particulates, natural graphite, artificial graphite, acetylene black, ketjen black, carbon fibers, or carbon nanotubes; metallic materials, such as copper, nickel, aluminum, silver, and the like, in powder, fiber, or tube form; and a conductive polymer such as polyphenylene derivatives. Any conducting agent available in the art may be used.

Non-limiting examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Non-limiting examples of the solvent are N-methyl-pyrrolidone (NMP), acetone, and water. Any material available for these purposes in the art may be used.

The amounts of the positive electrode active material, the conducting agent, the binder, and the solvent are those levels that are generally used to the manufacture of a lithium battery. According to another embodiment of the present disclosure, there is provided a lithium secondary battery including the above-described negative electrode. An example of manufacturing the lithium battery is as follows.

A positive electrode and a negative electrode may be manufactured as described above.

Next, a separator to be disposed between the positive electrode and the negative electrode may be prepared. The separator for the lithium battery may be any separator that is commonly used in lithium batteries. In some embodiments, the separator may have low resistance to migration of ions in an electrolyte and have an excellent electrolyte-retaining ability. Examples of the separator are glass fiber, polyester, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. In some embodiments, the separator composition may be directly coated on an electrode, and then dried to form the separator. In some embodiments, the separator composition may be cast on a support and then dried to form a separator film, which may then be separated from the support and laminated on an electrode to form the separator.

In some embodiments, the polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an electrolyte may be prepared.

For example, the electrolyte may be an organic electrolytic solution. Alternately, the electrolyte may be in a solid phase. Non-limiting examples of the electrolyte are boron oxide and lithium oxynitride. Any material available as a solid electrolyte in the art may be used. The solid electrolyte may be formed on the negative electrode by, for example, sputtering.

In some embodiments, an organic electrolytic solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethyl formamide, N,N-dimethyl acetamide, N,N-dimethylsulfoxide, 1,4-dioxane, 1,2-dimethoxyethane, sulfolane, dichloroethane, chlorobenzene, nitrobenzene, diethylene glycol, dimethyl ether, and mixtures thereof.

The lithium salt may be any material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, or a mixture thereof.

Referring to FIG. 1, a lithium secondary battery 10 includes a positive electrode 13, a negative electrode 12, and a separator 14. In some embodiments, the positive electrode 13, the negative electrode 12 and the separator 14 may be wound or folded, and then sealed in a battery case 15. Then, the battery case 15 may be filled with an organic electrolytic solution and sealed with a cap assembly 16, thereby completing the manufacture of the lithium secondary battery 10. In some embodiments, the battery case 15 may have a cylindrical shape, a rectangular shape or a thin-film shape. For example, the lithium battery 100 may be a large-size thin film battery. In some embodiments, the lithium secondary battery 10 may be a lithium ion battery.

In some embodiments, the separator may be interposed between the positive electrode and the negative electrode to form a battery assembly. In some embodiments, the battery assembly may be stacked in a bi-cell structure and impregnated with the electrolytic solution. The resultant is put into a pouch and hermetically sealed, thereby completing the manufacture of a lithium ion polymer battery.

In some embodiments, a plurality of battery assemblies may be stacked to form a battery pack, which may be used in any device that operates at high temperatures and requires high output, for example, in a laptop computer, a smart phone, electric vehicle, and the like.

In some embodiments, the lithium secondary battery may have improved storage stability at high temperatures, improved lifetime characteristics, and high rate characteristics, and thus may be applicable in an electric vehicle (EV), for example, in a hybrid vehicle such as plug-in hybrid electric vehicle (PHEV).

In some embodiments, the lithium secondary battery may have a discharge capacity of about 800 mAh/g or greater per unit weight of the negative electrode active material. In some embodiments, the lithium secondary battery may have a discharge capacity of about 1000 mAh/cc or greater per unit volume of the negative electrode active material.

In some embodiments, the solvent for the electrolytic solution may be at least one selected from the group consisting of acetonitrile, dimethyl ketone, and propylene carbonate.

In some embodiments, the electrolytic solution may further include an alkali metal salt having a solubility of about 0.01 mole/L or greater in the solvent, and being electrically inert in an operating voltage range of the capacitor. For example, the alkali metal salt may be lithium perchlorate, lithium tetrafluoroborate, or lithium hexafluorophosphate. In some embodiments, the electrolytic solution may further include an additional additive(s) to improve physical characteristics of the capacitor. Examples of the additive are a stabilizer and a thickening agent.

One or more embodiments will be described in detail with reference to the following examples. However, these examples are not intended to limit the scope of the one or more embodiments.

EXAMPLES

Preparation Example 1

Preparation of Silicon Oxide

Plasma discharging was induced in a plasma torch so that a plasma beam in the negative electrode-positive electrode field was accelerated to melt and evaporate Si lump in the furnace hearth. The resulting product was passed through a cooling column, and then crude larger particles from the resulting product were removed in a cyclone. The collected nanosized particles were passed through primary and secondary traps to obtain final nano-SiOx ($0<X\leq2$) powder having an average particle diameter of about 5 μm. The plasma powder was from about 40 KW to about 50 KW, and a mixed gas of $N_2$ and Ar was used as a plasma gas.

Example 1

Preparation of Negative Electrode Active Material

Silicon oxide (SiOx, $0<X\leq2$, 100 g) of Preparation Example 1, having an average particle diameter of about 5 μm, pitch (10 g), (Si, 20 g) having an average particle diameter of about 5 μm, and nickel silicide (0.5 g) were mixed together to prepare a negative electrode active material composition.

The negative electrode active material composition was subjected to spray-drying at a pressure of about 400 Pa at about 800° C. for about 2 hours to prepare a negative electrode active material including amorphous silicon oxide, crystalline silicon, carbon, and nickel silicide and including spherical particles and whiskers.

The spherical particles of the negative electrode active material had an average particle diameter of about 7.5 μm, and the whiskers had a length of about 2 μm and a thickness of about 15 nm.

The amount of amorphous silicon oxide in the negative electrode active material was about 20 parts by weight, the amount of crystalline silicon oxide was about 40 parts by weight, the amount of silicon was about 30 parts by weight, the amount of carbon was about 9.5 parts by weight, and the amount of nickel silicide was about 0.5 parts by weight, each based on 100 parts by weight of the negative electrode active material.

Example 2

Preparation of Negative Electrode Active Material

A negative electrode active material was prepared in the same manner as in Example 1, except that 1 g of nickel silicide was used.

Example 3

Preparation of Negative Electrode Active Material

A negative electrode active material was prepared in the same manner as in Example 1, except that 2 g of nickel silicide was used.

Example 4

Preparation of Negative Electrode Active Material

A negative electrode active material was prepared in the same manner as in Example 1, except that 4 g of nickel silicide was used.

Example 5

Preparation of Negative Electrode Active Material

A negative electrode active material was prepared in the same manner as in Example 1, except that 5 g of nickel silicide was used.

Example 6

Preparation of Negative Electrode Active Material

A negative electrode active material was prepared in the same manner as in Example 3, except that 10 g of sucrose, instead of 10 g of pitch, was used.

Comparative Example 1

Preparation of Negative Electrode Active Material

Silicon oxide (SiOx, $0<X\leq2$, 100 g) having an average particle diameter of about 5 μm, and silicon (Si, 20 g) were mixed together to prepare a negative electrode active material composition.

The negative electrode active material composition was thermally evaporated in a furnace at about 800° C. for about 2 hours to obtain a negative electrode active material consisting of silicon oxide and silicon particles.

Negative electrode active material (100 g), pitch (10 g), and N-methylpyrrolidone (NMP, 300 g) as a solvent were mixed together to obtain a mixture, which was then dried at about 150° C., and thermally treated at about 800° C. to form pitch-carbon coating film on a surface of the negative electrode active material, thereby completing the preparation of the negative electrode active material.

Manufacture Example 1

Manufacture of Negative Electrode and Coin Cell

The negative electrode active material of Example 1 (10 g), 1 g of a carbon conducting agent (Super-P, Timcal Inc., Inc., Bodio, Switzerland, 1 g), and a binder (polyamide/imide, PAI, 3 g) were mixed together with N-methylpyrrolidone (NMP, 15 mL) in an agate mortar to prepare a slurry. The slurry was coated on a Cu current collector to a thickness of about 100 μm using a doctor blade. Then, the resultant was dried at room temperature for 2 hours, and then dried again at 350° C. in a vacuum for 1 hour to manufacture a negative electrode.

The negative electrode, a lithium metal as a counter electrode, a polypropylene separator (Celgard 3510, Celgard, LLC, Charlotte, N.C.), and an electrolytic solution obtained by dissolving 1.3 M of $LiPF_6$ in a mixed solvent of ethylene carbonate (EC) and diethyl carbonate (DEC) (weight ratio of 3:7) were used to manufacture a CR-2016 standard coin cell.

Manufacture Examples 2-6

Manufacture of Negative Electrodes and Coin Cells

Coin cells were manufactured in the same manner as in Manufacture Example 1, except that negative electrodes were manufactured using the negative electrode active materials of Examples 2-6, respectively, instead of the negative electrode active material of Example 1.

Comparative Manufacture Example 1

Manufacture of Negative Electrode and Coin Cell

A coin cell was manufactured in the same manner as in Manufacture Example 1, except that the negative electrode was manufactured using the negative electrode active material of Comparative Example 1, instead of the negative electrode active material of Example 1.

Evaluation Example 1

Scanning Electron Microscopic (SEM) Analysis

Scanning electron microscopic (SEM) analysis was performed on the negative electrode active materials of Examples 1-6. The SEM images of the negative electrode active materials of Examples 1-6 are shown in FIGS. 2 to 7, respectively.

FIGS. 2 to 6 are SEM images of the negative electrode active materials of Examples 1-5, respectively. FIGS. 7A to 7D are SEM images of the negative electrode active material of Example 6.

Referring to FIGS. 2 to 6, inclusion of a larger the amount of nickel silicide affords a higher ratio of whiskers to spherical particles in the negative electrode active material.

Referring to FIGS. 7A to 7D, the negative electrode active material prepared using sucrose as a carbon precursor was found to include spherical particles and non-spherical particles, unlike the negative electrode active materials using pitch as the carbon precursor.

Evaluation Example 2

Analysis of Particle Shape and Size of Negative Electrode Active Material

The negative electrode active material of Example 1 were analyzed by SEM. The results are shown in FIGS. 8A to 8C.

Figure 8A:
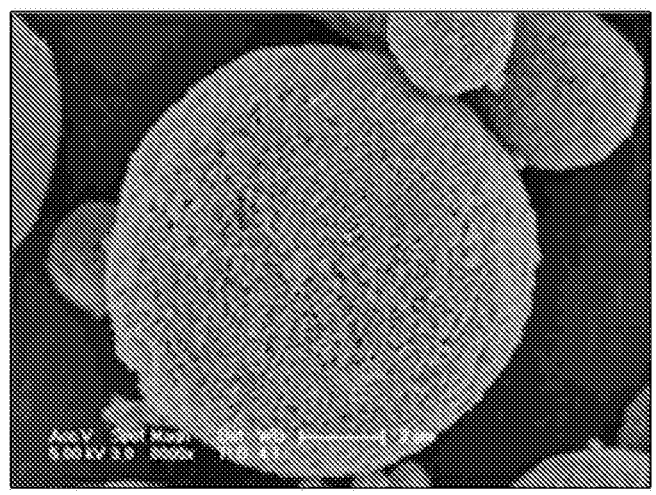
FIGS. 8A to 8C are SEM images of the negative electrode active material of Example 1.
Figure 8B:
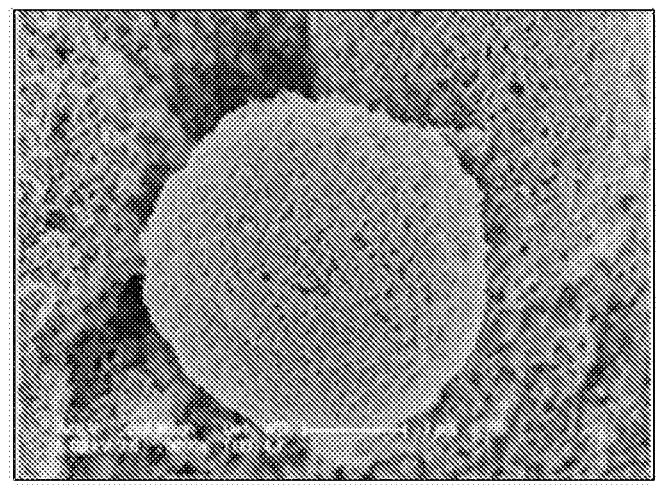
Figure 8C:
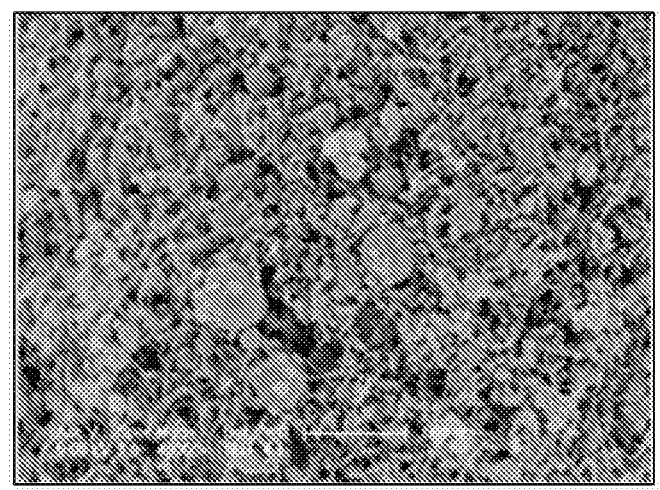

Referring to FIG. 8A, the negative electrode active material of Example 1 was found to include spherical particles having an average particle diameter of about 5 to 15 μm. Referring to FIGS. 8B and 8C, which are magnified surface views of FIG. 8A, the negative electrode active material of Example 1 was found to include whiskers, in addition to the spherical particles.

Evaluation Example 3

Transmission Microscopic (TEM) Analysis

The negative electrode active material of Example 1 was analyzed by transmission microscopy (TEM). The results are shown in FIGS. 9 to 12.

Figure 9:
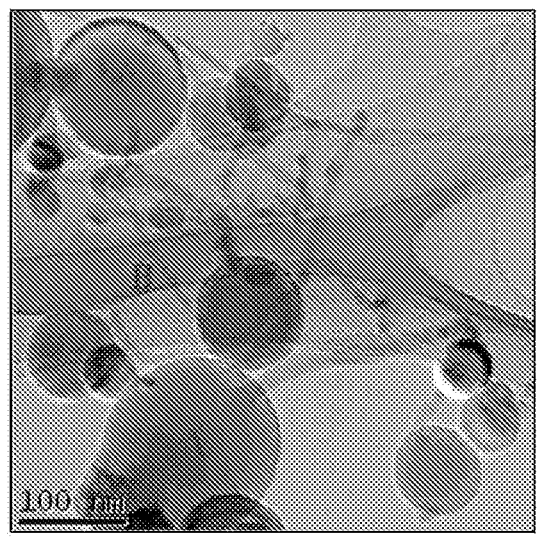
FIG. 9 is a transmission electron microscopic (TEM) image of the negative electrode active material of Example 1.

Referring to FIG. 9, the negative electrode active material of Example 1 was found to include spherical particles A and whiskers B.

Figure 10:
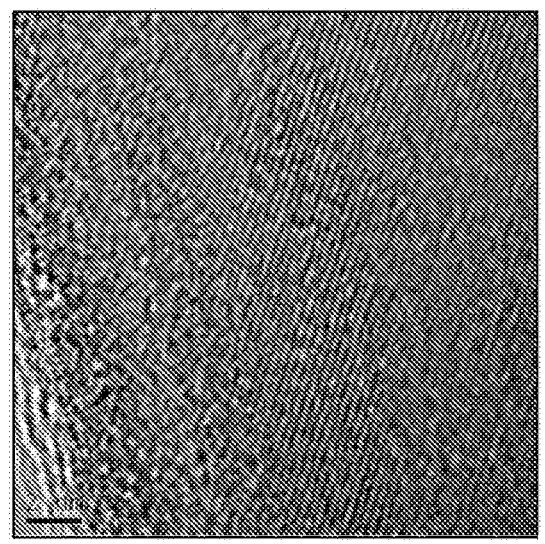
FIGS. 10 to 12 are magnified TEM images of regions A and B in FIG. 9.

FIG. 10 is a magnified view of the spherical particles A, which consist of crystalline silicon and amorphous silicon oxide.

Figure 11:
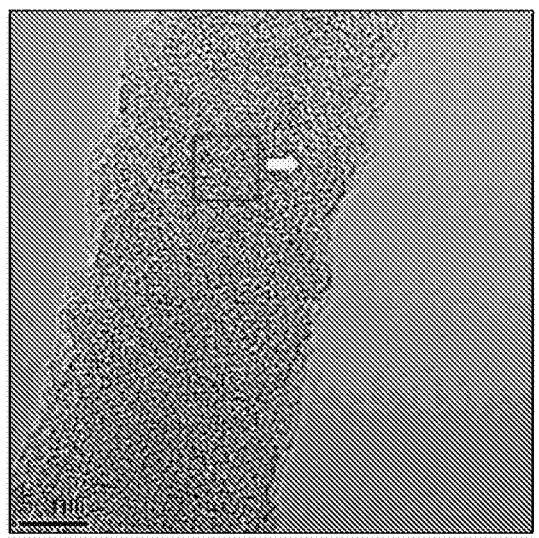
Figure 12:
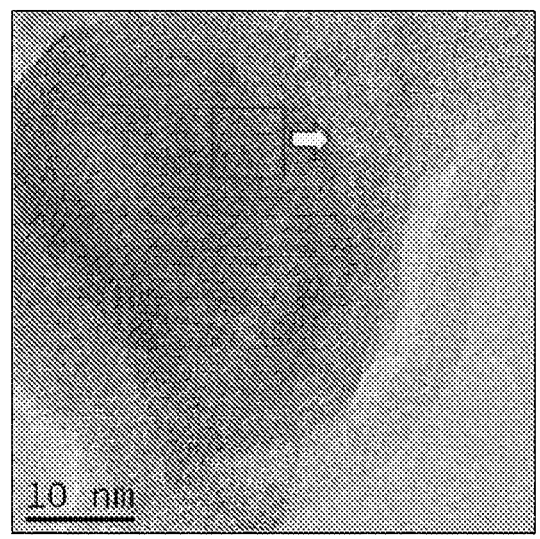

FIGS. 11 and 12 are magnified views of the whiskers B in FIG. 9, which consist of crystalline silicon, amorphous silicon oxide, and nickel silicide.

Evaluation Example 4

X-Ray Diffraction (XRD) Analysis

X-ray diffraction analysis was performed on the negative electrode active material of Example 1. The results are shown in FIG. 13.

The XRD analysis was performed using a XPERT-PRO (available from Philips Analytical, Almelo, The Netherlands) analyzer at a CuK-α X-ray wavelength of 1.541 Å.

Figure 13:
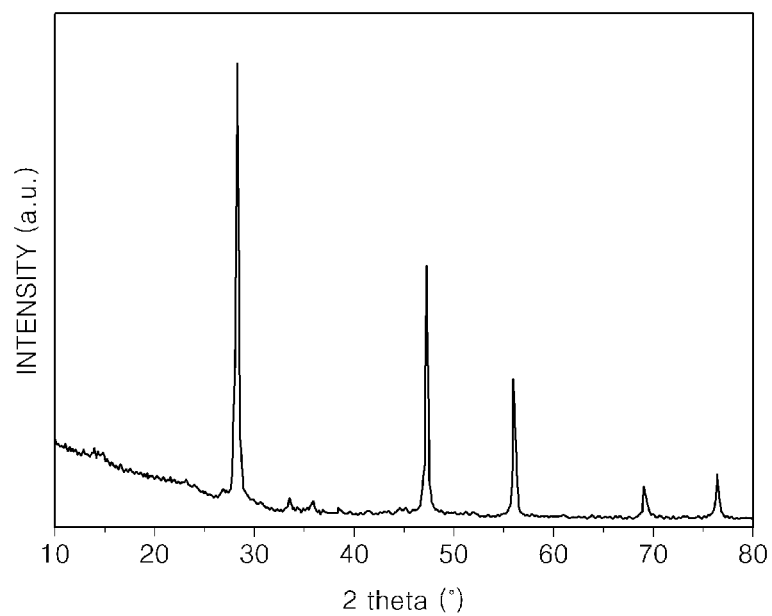
FIG. 13 is an X-ray diffraction spectrum of the negative electrode active material of Example 1.

Referring to an XRD spectrum in FIG. 13, a peak from the Si(111) plane appeared at a Bragg angle 2θ of about 28°, and a peak from the SiC(111) plane was found at a Bragg angle 2θ of about 36°. Peaks at a Bragg angle 2θ of about 47° and about 56° were from Si, and a peak at a Bragg angle of about 36° was from nickel silicide.

Evaluation Example 5

Inductively Coupled Plasma Analysis

Inductively coupled plasma analysis was performed using the negative electrode active materials of Examples 1-6. The results are shown in Table 1 below.

TABLE 1

|  | Nickel (Ni) (wt %) |
| --- | --- |
| Example 1 | 0.5 |
| Example 2 | 1 |

TABLE 1-continued

|  | Nickel (Ni) (wt %) |
|---|---|
| Example 3 | 2 |
| Example 4 | 4 |
| Example 5 | 5 |
| Example 6 | 0.5 |

Evaluation Example 6

X-Ray Fluorescence (XRF) Analysis

X-ray fluorescence (XRF) analysis was performed on the negative electrode active materials of Examples 1-6 and Comparative Example 1. The results are shown in Table 2 below.

The XRF analysis was performed using a wavelength dispersive XRF (WD-XRF) analyzer (Philips Analytical, PW2400).

Silicon, oxygen, and carbon contents in each of the negative electrode active materials of Examples 1 to 6 and Comparative Example 1 are shown in Table 2 below.

TABLE 2

|  | Silicon (Si) (wt %) | Oxygen (O) (wt %) | Carbon (C) (wt %) |
|---|---|---|---|
| Example 1 | 60~63 | 27~35 | 5~10 |
| Example 2 | 63~66 | 24~32 | 5~10 |
| Example 3 | 67~70 | 20~28 | 5~10 |
| Example 4 | 70~73 | 17~25 | 5~10 |
| Example 5 | 73~76 | 14~22 | 5~10 |
| Example 6 | 62~65 | 25~32 | 5~10 |
| Comparative Example 1 | 63~66 | 24~32 | 5~10 |

Evaluation Example 7

Charge-Discharge Test

The coin cell manufactured according to Manufacture Example 1 was charged at a current of 1400 mA (per 1 g of the negative electrode active material) to a voltage of 0.01V (with respect to Li), and then discharged at the same current flow rate to a voltage of 1.5V (with respect to Li). Then, this cycle of charging and discharging was repeated 50 times at the same current flow rate in the same voltage range.

A discharge capacity at 1st cycle, initial charge/discharge efficiency, and capacity retention rate of each of the coin cells manufactured according to Manufacture Examples 1 to 6 and Comparative Example 1 are shown in Table 3 below. The capacity retention rate and the initial charge/discharge efficiency are defined as Equations 1 and 2 below, respectively.

Capacity retention rate (%)=[50th cycle discharge capacity/2nd cycle discharge capacity]×100        Equation 1

Initial charge/discharge efficiency (%)=[1st cycle discharge capacity/1st cycle charge capacity]×100        Equation 2

TABLE 3

| Example | 1$^{st}$ Cycle discharge capacity [mAh/g] | Initial charge/discharge efficiency [%] | Capacity retention rate [%] |
|---|---|---|---|
| Manufacture Example 1 | 1420 | 56 | 60 |
| Manufacture Example 2 | 1450 | 60 | 70 |
| Manufacture Example 3 | 1480 | 62 | 73 |
| Manufacture Example 4 | 1580 | 65 | 75 |
| Manufacture Example 5 | 1810 | 70 | 78 |
| Comparative Manufacture Example 1 | 1390 | 53 | 55 |

Referring to Table 3 above, the coin cells of Manufacture Examples 1 to 6 were found to have higher discharge capacities, higher initial efficiencies, and higher capacity retention rates, than the coin cell of Comparative Example 1.

Figure 14:
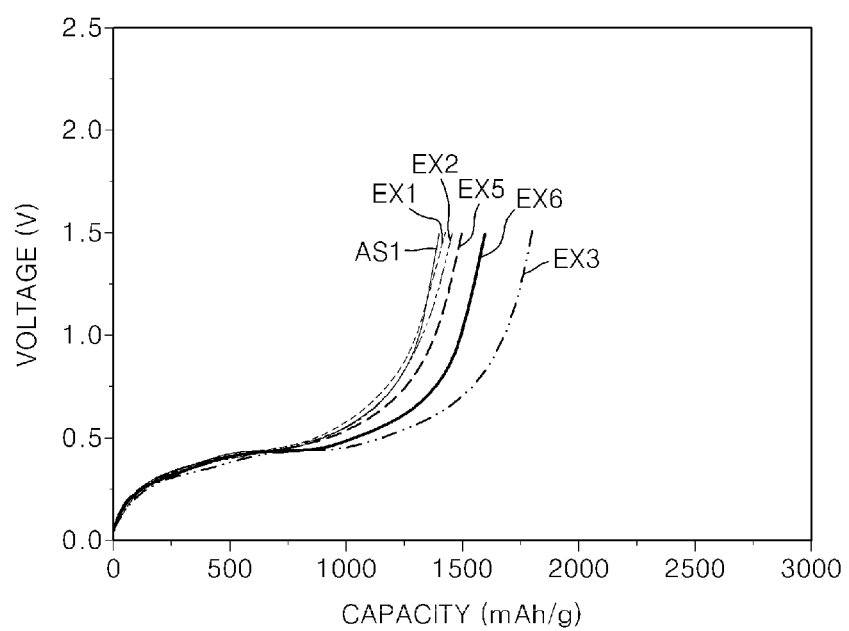
FIG. 14 is a graph illustrating cell potential characteristics with respect to capacity in coin cells of Manufacture Examples 1, 2, 3, 5, and 6 and Manufacture Comparative Manufacture Example 1.

Cell potential characteristics with respect to capacity were evaluated using the coin cells of Manufacture Examples 1, 2, 3, 4, 5, and 6, and Comparative Manufacture Example 1. The results are shown in FIG. 14. In FIG. 14, AS1, EX1, EX2, EX3, EX4, EX5, and EX6 denote Comparative Manufacture Example 1, and Manufacture Examples 1, 2, 3, 4, 5, and 6, respectively.

Referring to FIG. 14, the coin cells of Manufacture Examples 1 to 6 were found to have improved cell potential characteristics as compared with the coin cell of Comparative Manufacture Example 1.

As described above, according to the one or more of the above embodiments of the present invention, a negative electrode active material may be easily synthesized using spray-drying. A lithium secondary battery with improved conductivity, discharge capacity and lifetime characteristics may be manufactured using the negative electrode active material.

In the present disclosure, the terms "Example," "Comparative Example," "Manufacture Example," "Comparative Manufacture Example," and "Evaluation Example" are used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A negative electrode active material comprising amorphous silicon oxide, crystalline silicon, carbon, and metal silicide components, wherein the metal silicide component and one or more of silicon oxide, crystalline silicon and carbon is included in spherical particles and whiskers, wherein the negative electrode active material is made by a process comprising:
   mixing amorphous silicon oxide, carbon precursor, silicon, metal silicide, and a first solvent together to obtain a negative electrode active material composition; and
   spray-drying the negative electrode active material composition to provide the negative electrode active material.

2. The negative electrode active material of claim 1, wherein the metal silicide is at least one selected from the group consisting of nickel silicide, titanium silicide, titanium silicide, copper silicide, and iron silicide.

3. The negative electrode active material of claim 1, wherein an amount of the metal silicide is from about 0.5 parts to about 10 parts by weight based on 100 parts by weight of a total weight of the negative electrode active material.

4. The negative electrode active material of claim 1, wherein the whiskers comprise amorphous silicon oxide, crystalline silicon, and metal silicide.

5. The negative electrode active material of claim 1, wherein the spherical particles comprise amorphous silicon oxide and crystalline silicon.

6. The negative electrode active material of claim 1, wherein the spherical particles have an average particle diameter of from about 5 μm to about 15 μm.

7. The negative electrode active material of claim 1, wherein the whiskers have a length of from about 1 μm to about 5 μm, and a thickness of about from 10 nm to about 20 nm.

8. The negative electrode active material of claim 1, wherein an amount of the silicon oxide in the negative electrode active material is from about 70 parts to about 90 parts by weight based on 100 parts by weight of a total weight of the negative electrode active material.

9. The negative electrode active material of claim 1, wherein an amount of the carbon in the negative electrode active material is from about 1 part to about 10 parts by weight based on 100 parts by weight of a total weight of the negative electrode active material.

10. The negative electrode active material of claim 1, wherein an amount of the silicon in the negative electrode active material is from about 10 parts to about 20 parts by weight based on 100 parts by weight of a total weight of the negative electrode active material.

11. A method of preparing a negative electrode active material, the method comprising:

mixing amorphous silicon oxide, carbon precursor, silicon, metal silicide, and a first solvent together to obtain a negative electrode active material composition; and spray-drying the negative electrode active material composition, wherein the electrode active material comprising amorphous silicon oxide, crystalline silicon, carbon, and metal silicide components, wherein one or more of the components is included in spherical particles and whiskers.

12. The method of claim 11, wherein the spray-drying comprises spraying the negative electrode active material composition at a pressure of from about 300 Pa to about 500 Pa.

13. The method of claim 11, wherein the carbon precursor is at least one selected from the group consisting of carbon black, pitch, sucrose, carbon nanotube (CNT), and phenol resin.

14. The method of claim 11, wherein the spray-drying comprises spraying the negative electrode active material composition at a temperature of from about 700° C. to about 1000° C.

15. The method of claim 11, wherein an amount of the silicon is from about 10 parts to about 200 parts by weight based on 100 parts by weight of the amorphous silicon oxide.

16. The method of claim 11, wherein an amount of the carbon precursor is from about 5 parts to about 30 parts by weight based on 100 parts by weight of the amorphous silicon oxide.

17. The method of claim 11, wherein an amount of the metal silicide is from about 1 part to about 10 parts by weight based on 100 parts by weight of the amorphous silicon oxide.

18. A lithium secondary battery comprising a negative electrode including the negative electrode active material of claim 1.

* * * * *